(12) United States Patent
Kawabata

(10) Patent No.: US 9,886,825 B2
(45) Date of Patent: Feb. 6, 2018

(54) MONEY PROCESSING APPARATUS

(71) Applicant: FUJI ELECTRIC CO., LTD., Kawasaki-shi, Kanagawa (JP)

(72) Inventor: Yasuyuki Kawabata, Yokkaichi (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/631,718

(22) Filed: Jun. 23, 2017

(65) Prior Publication Data

US 2018/0012456 A1 Jan. 11, 2018

(30) Foreign Application Priority Data

Jul. 11, 2016 (JP) ................. 2016-136845

(51) Int. Cl.
| | | |
|---|---|---|
| *G07F 19/00* | (2006.01) | |
| *G07D 9/02* | (2006.01) | |
| *G06F 12/14* | (2006.01) | |
| *G06F 21/62* | (2013.01) | |
| *G07F 5/24* | (2006.01) | |
| *G07G 1/06* | (2006.01) | |
| *G07D 11/00* | (2006.01) | |
| *G07D 3/12* | (2006.01) | |

(52) U.S. Cl.
CPC ............ *G07F 19/203* (2013.01); *G06F 12/14* (2013.01); *G06F 21/62* (2013.01); *G07D 9/02* (2013.01); *G07F 5/24* (2013.01); *G07G 1/06* (2013.01); *G07D 3/12* (2013.01); *G07D 3/125* (2013.01); *G07D 11/00* (2013.01)

(58) Field of Classification Search
CPC ..... G07F 1/00; G07F 1/02; G07F 1/04; G07F 3/00; G07F 3/04; G07F 5/24; G07D 1/00; G07D 1/02; G07D 1/04; G07D 1/06; G07D 1/08; G07D 3/00; G07D 3/02; G07D 3/04; G07D 3/06; G07D 3/08; G07D 3/10; G07D 3/12; G07D 3/121; G07D 3/123; G07D 3/125; G07D 3/126; G07D 3/128; G07D 3/14; G07D 3/16; G07D 9/008; G07D 11/00; G07D 11/0033; G07D 11/0081; G07D 2201/00; G07D 2205/00; G07G 1/06; G07G 1/0027; B65H 29/58; B65H 29/60; B65H 31/24; B65H 2301/332; B65H 2301/4217; B65H 2301/4455; B65H 2404/63; B65H 2404/6591; B65H 2405/33; B65H 2408/11; B65H 2408/111; B65H 2408/112

USPC .......................... 194/344, 346; 271/292–305
See application file for complete search history.

(56) References Cited

U.S. PATENT DOCUMENTS

2011/0127286 A1  6/2011  Tabata et al.

FOREIGN PATENT DOCUMENTS

| JP | 2006-285472 A | 10/2006 |
| JP | 2015-228161 A | 12/2015 |

*Primary Examiner* — Jeffrey A Shapiro
(74) *Attorney, Agent, or Firm* — Manabu Kanesaka

(57) ABSTRACT

A money processing apparatus that performs input/output processing of money in a money unit configured to be pulled out from a casing and opened includes an actuator provided in the money unit; and an engagement portion provided in the actuator, configured to engage with the casing to lock pulling out or opening of the money unit in a stopped state due to power cut.

7 Claims, 9 Drawing Sheets

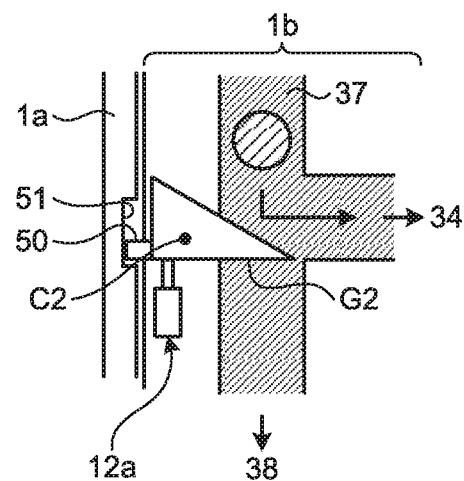
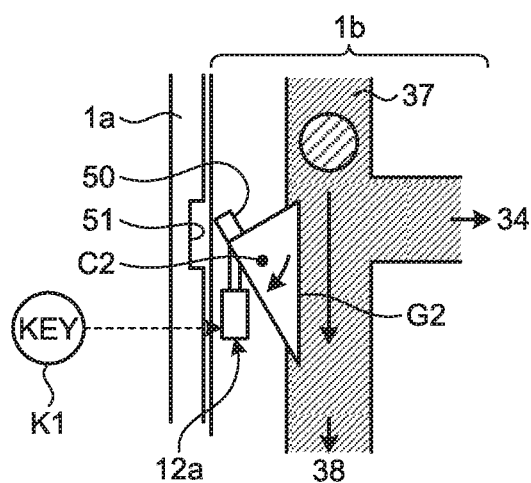

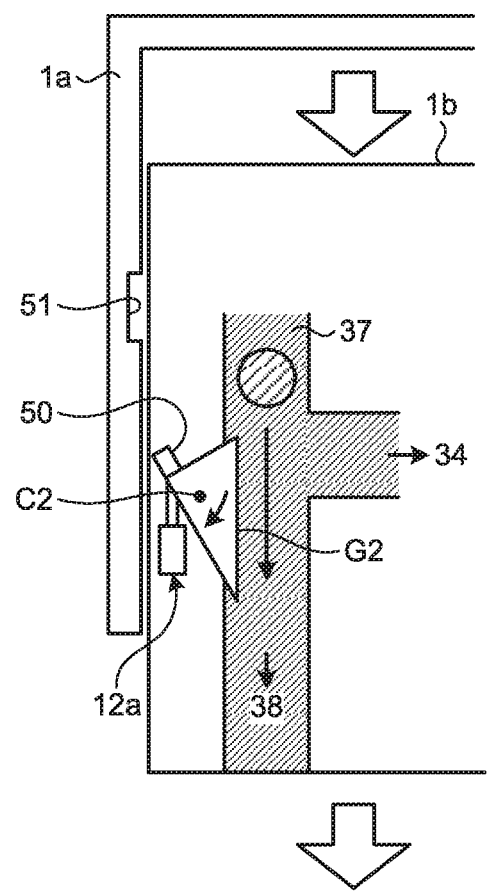

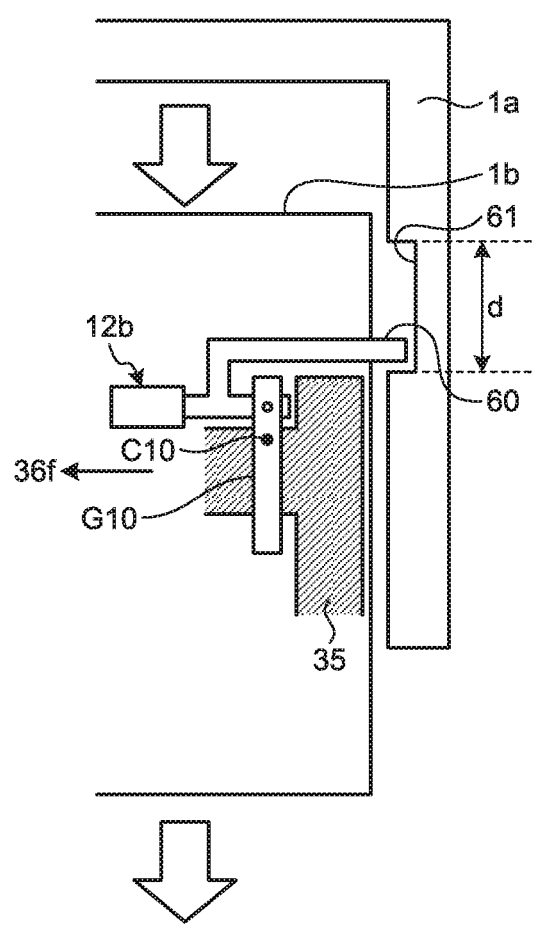

MONEY PROCESSING APPARATUS

CROSS-REFERENCE TO RELATED APPLICATION(S)

The present application claims priority to and incorporates by reference the entire contents of Japanese Patent Application No. 2016-136845 filed in Japan on Jul. 11, 2016.

BACKGROUND

The present disclosure relates to a money processing apparatus.

In the related art, an automatic change machine has been used in shops such as supermarkets and convenience stores in order to achieve strictness in handling of customers and cash management. A POS (Point Of Sales) register apparatus or the like is connected to the automatic change machine and the POS register apparatus instructs input/output processing of money such as coins and bills to the automatic change machine. The input/output processing includes change processing.

To ensure strictness of the input/output processing, the automatic change machine is provided with a lock mechanism so that a coin storage unit that stores therein coins and a bill storage unit that stores therein bills are not opened in a case power supply is cut off.

For example, in Japanese Laid-open Patent Publication No. 2006-285472 and Japanese Laid-open Patent Publication No. 2015-228161, dedicated locking means for locking a coin roll drawer in a casing when the coin roll drawer is housed in the casing, is provided.

If power supply is cut off, the automatic change machine becomes a stopped state completely as a device. In the stopped state, an event occurring in the automatic change machine cannot be recorded. For example, even if the coin storage unit and the bill storage unit are opened and money is drawn out illegally in the stopped state, the automatic change machine cannot detect and record that the coin storage unit and the bill storage unit are opened. Therefore, as described above, the automatic change machine is provided with locking means such as a dedicated electromagnetic lock, so that the coin storage unit and the bill storage unit cannot be opened in the stopped state to prevent occurrence of unauthorized usage.

However, provision of dedicated locking means hinders downsizing and causes an increase of the manufacturing cost for the money processing apparatus such as an automatic change machine.

SUMMARY

It is an object of the present disclosure to at least partially solve the problems in the related art.

In some embodiments, a money processing apparatus that performs input/output processing of money in a money unit configured to be pulled out from a casing and opened includes: an actuator provided in the money unit; and an engagement portion provided in the actuator, configured to engage with the casing to lock the money unit to the casing during a stopped state due to a power cut.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4A and 4B are schematic diagrams respectively illustrating a state in which a coin processing unit is locked to a casing and a state in which the coin processing unit is unlocked;

FIG. 5 is a schematic diagram illustrating a state in which the coin processing unit is pulled out from the casing;

FIG. 7 is a schematic diagram schematically illustrating a state in which a pull-out amount of the coin processing unit is limited;

DETAILED DESCRIPTION OF THE PREFERRED EMBODIMENTS

Embodiments for carrying out the present disclosure will be described below with reference to the accompanying drawings.

Configuration of Money Processing Apparatus

Figure 1:
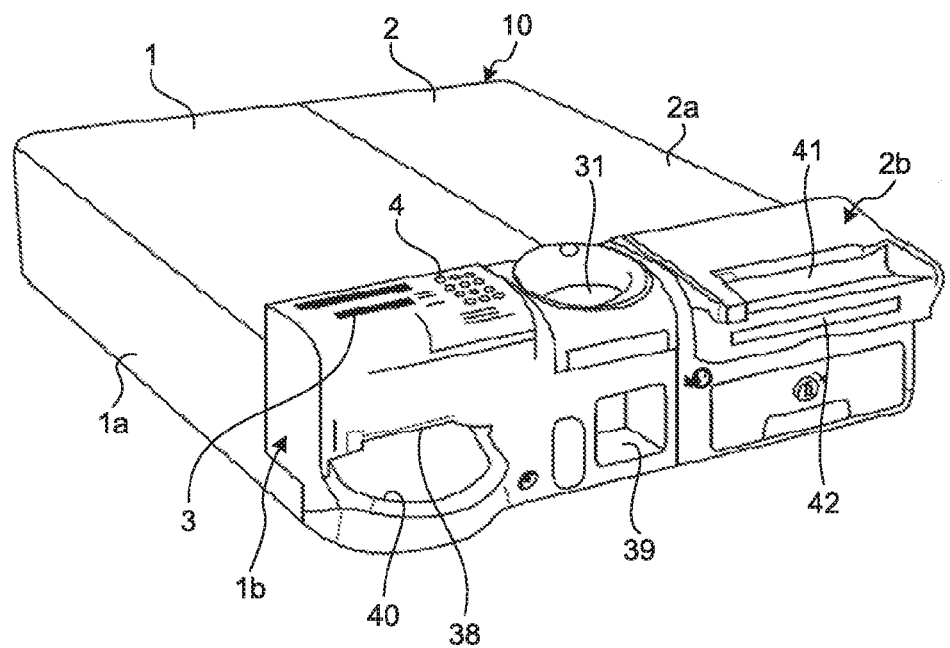
FIG. 1 is a perspective view illustrating a configuration of a money processing apparatus according to an embodiment of the present disclosure.
Figure 2:
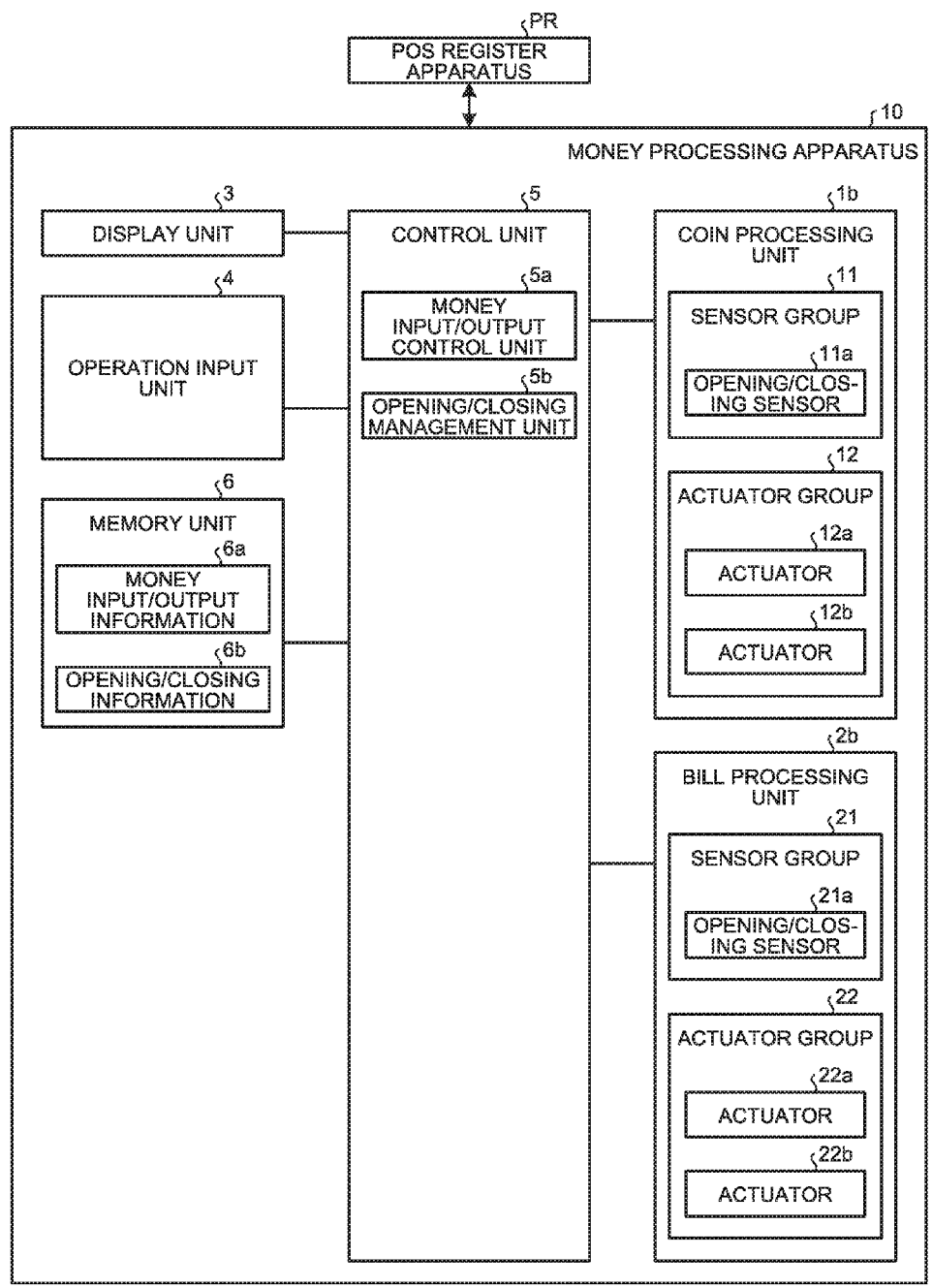
FIG. 2 is a block diagram illustrating a configuration of a control system of the money processing apparatus.

FIG. 1 is a perspective view illustrating a configuration of a money processing apparatus 10 according to an embodiment of the present disclosure. FIG. 2 is a block diagram illustrating a configuration of a control system of the money processing apparatus 10. The money processing apparatus 10 illustrated herein is used as an automatic change machine connected to a POS register apparatus PR in shops such as supermarkets and convenience stores. As illustrated in FIG. 1 and FIG. 2, a flat surface is formed on an upper surface of the money processing apparatus 10, and a POS register apparatus PR being a higher-level device is placed on the flat surface. The money processing apparatus 10 includes a coin processing apparatus 1 that performs input and output of coins and a bill processing apparatus 2 that performs input and output of bills. The coin processing apparatus 1 and the bill processing apparatus 2 are covered by a casing formed in a rectangular shape and arranged adjacent to each other.

The coin processing apparatus 1 includes a coin slot 31 on the right side of a front end upper surface of a coin processing unit 1b that can be pulled out from a casing 1a. A coin output port 38 is formed on the left side of a front surface of the coin processing unit 1b, and coins discharged from the coin output port 38 are received in a receiving tray 40. A coin return port 39 is provided on the right side of the front surface of the coin processing unit 1b. Meanwhile, the bill processing apparatus 2 also includes a bill processing unit 2b that can be pulled out from a casing 2a. A bill slot 41 and a bill output port 42 are provided on an upper part of a front surface of the bill processing unit 2b.

The coin processing unit 1b includes a display unit 3 and an operation input unit 4 on the left side on the front end upper surface. The display unit 3 and the operation input unit 4 are also a display unit and an operation input unit of the bill processing apparatus 2. A controller 5 and a memory 6 are provided in the money processing apparatus 10.

The coin processing unit 1b includes a sensor group 11 including various types of elements and an actuator group 12 including various types of elements. The bill processing unit 2b also includes various types of sensor group 21 and actuator group 22.

The controller 5 includes a money input/output controller 5a. The money input/output controller 5a performs money input processing in response to a money-input permitting instruction, upon insertion of money after the money-input permitting instruction is provided from the POS register apparatus PR, and performs money output processing in response to a money output instruction when the money output instruction is provided from the POS register apparatus PR. The money input/output controller 5a also performs processing to sequentially store contents of the performed money input processing and money output processing in the memory 6 as money input/output information 6a, while performing the money input processing and the money output processing.

The controller 5 also includes an opening/closing management unit 5b. When the coin processing unit 1b or the bill processing unit 2b is pulled out or the coin processing unit 1b or the bill processing unit 2b is opened, the opening/closing management unit 5b memorizes this event as opening/closing information 6b in the memory 6 based on detection results of opening/closing sensors 11a and 21a.

Internal Configuration of Coin Processing Apparatus

Figure 3:
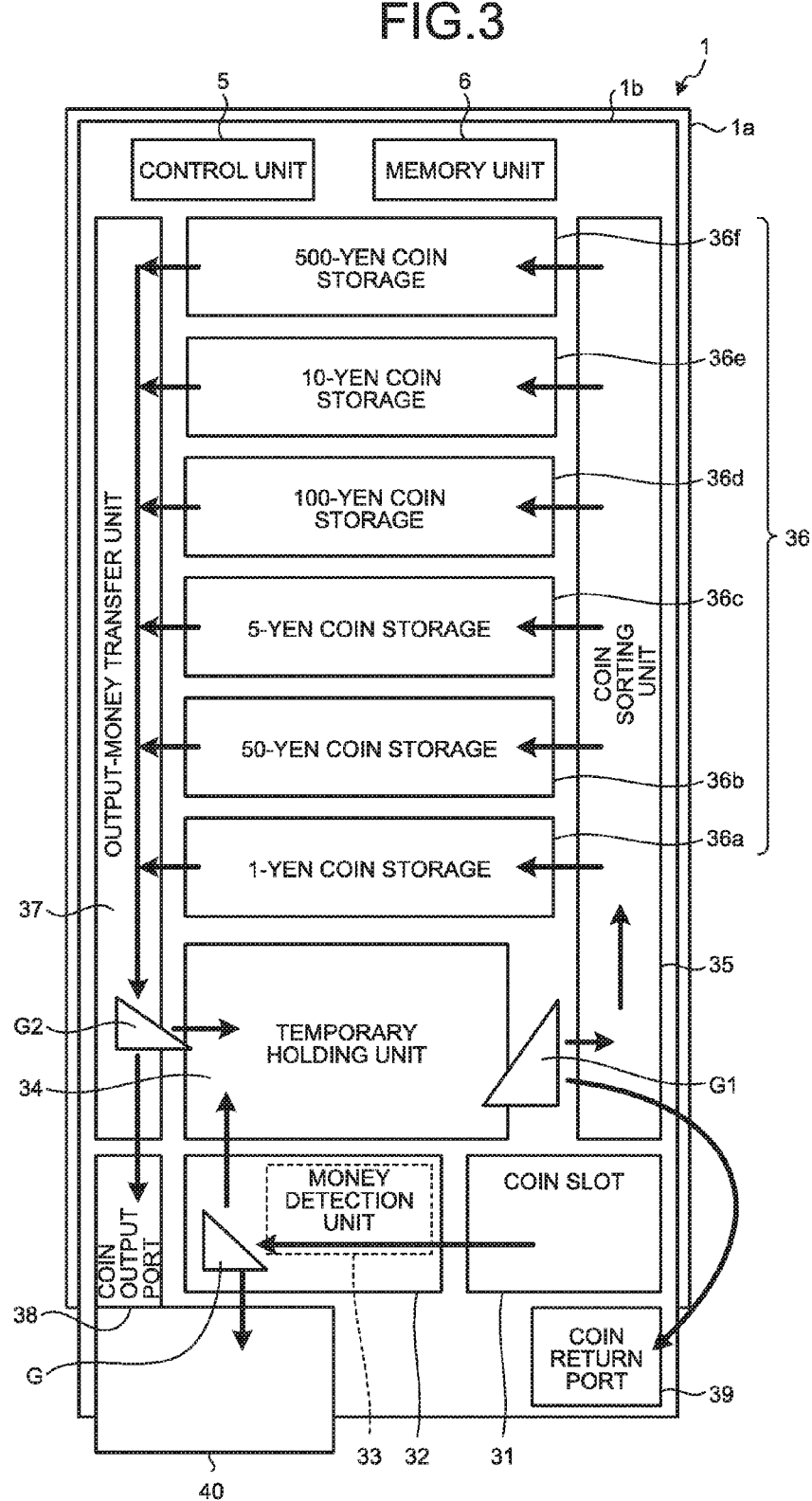
FIG. 3 is a plan view schematically illustrating an internal configuration of a coin processing apparatus illustrated in FIG. 1.

FIG. 3 is a plan view schematically illustrating an internal configuration of the coin processing apparatus 1 illustrated in FIG. 1. In FIG. 3, the coin slot 31 is an opening for accepting therethrough coins inserted into the apparatus body. The coins inserted to the coin slot 31 are detected by an insertion detection sensor (not illustrated) and transferred by an input-money transfer unit 32 in response to the money input permitting instruction from the POS register apparatus PR. A money detection unit 33 provided in the input-money transfer unit 32 determines the authenticity and denomination of coins. If the transferred coin is a specie, the coin is held in a temporary holding unit 34. On the other hand, if the transferred coin is not a specie, the coin is returned to the receiving tray 40 via a switching gate G and the coin output port 38. When there is a return instruction from the POS register apparatus PR or from a return lever (not illustrated), the coin held in the temporary holding unit 34 is returned to the coin return port 39 via a switching gate G1.

Thereafter, the temporary holding unit 34 functions as a transfer path, and the coins held in the temporary holding unit 34 are output to a coin sorting unit 35 being a transfer path via the switching gate G1 and transferred. The coins transferred by the coin sorting unit 35 are stored in coin storages 36 according to denomination. There are six coin storages 36 of a 1-yen coin storage 36a, a 50-yen coin storage 36b, a 5-yen coin storage 36c, a 100-yen coin storage 36d, a 10-yen coin storage 36e, and a 500-yen coin storage 36f in the coin processing unit 1b. The respective coin storages 36 store therein inserted coins individually for each of denominations.

The coins stored in the respective coin storages 36 can be transferred to the temporary holding unit 34 via an output-money transfer unit 37 and a switching gate G2. The temporary holding unit 34 also functions as a checking box for performing a checking operation in which the coins stored in the respective coin storages 36 are emptied once and the number of stored coins in the respective coin storages 36 is recalculated.

Thereafter, the coins of denominations corresponding to the money output instruction from the POS register apparatus PR are collectively taken out from the respective coin storages 36 via the output-money transfer unit 37 and the switching gate G2 and discharged to the outside from the coin output port 38.

The coin sorting unit 35, the output-money transfer unit 37, and the temporary holding unit 34 are driven respectively by using a motor. A switching gate (not illustrated) is respectively arranged at inlets and outlets of the respective coin storages 36, and is driven by a solenoid. The switching gates G1 and G2 are also driven by a solenoid.

Lock Mechanism of Coin Processing Unit

FIGS. 4A and 4B are schematic diagrams respectively illustrating a state in which the coin processing unit 1b is locked to the casing 1a and a state in which the coin processing unit 1b is unlocked. FIG. 5 is a schematic diagram illustrating a state in which the coin processing unit 1b is pulled out from the casing 1a.

The switching gate G2 is an actuator 12a driven by the solenoid. The switching gate G2 switches a transfer destination of coins transferred from the output-money transfer unit 37 to the side of the coin output port 38 or to the side of the temporary holding unit 34. As illustrated in FIG. 4A, an engagement portion 50 in a projecting shape is provided on the switching gate G2 on the side of the casing 1a. The engagement portion 50 engages with a concave engagement portion 51 provided on the side of the casing 1a at a position corresponding to the engagement portion 50 in the stopped state with a current not being supplied to the solenoid, to lock the coin processing unit 1b to the casing 1a. In the stopped state, coins transferred from the output-money transfer unit 37 are transferred to the side of the temporary holding unit 34.

On the other hand, as illustrated in FIG. 4B, when a current is supplied to the solenoid, a linear-motion shaft of the actuator 12a is elongated and rotated in a clockwise direction in the diagram around a shaft C2 of the switching gate G2, to switch the transfer direction of coins transferred from the output-money transfer unit 37 toward the side of the coin output port 38. At this time, engagement of the engagement portion 50 with the concave engagement portion 51 is released with the rotation of the switching gate G2, so that pull-out of the coin processing unit 1b from the casing 1a can be performed.

The engagement portion 50 is switched to a lock state or an unlock state by the actuator 12a. In the stopped state in which no current is supplied to the solenoid, the engagement portion 50 locks the coin processing unit 1b to the casing 1a. The lock mechanism uses drive of the actuator 12a of the existing switching gate G2, and new locking means for the lock mechanism does not need to be provided.

By providing such lock mechanism, even if the power supply to the money processing apparatus 10 is cut off, the lock mechanism maintains the lock state in the stopped state. Therefore, unauthorized usage such as illegal extraction of money can be prevented reliably.

As illustrated in FIG. 5, when the coin processing unit 1b is to be pulled out, a key K1 is inserted into a lock (not illustrated) provided in the coin processing unit 1b (see FIG. 4B) and rotated, to elongate the linear-motion shaft of the solenoid in conjunction with the rotation motion.

Stepwise Lock Mechanism of Coin Processing Unit

Figure 6A:
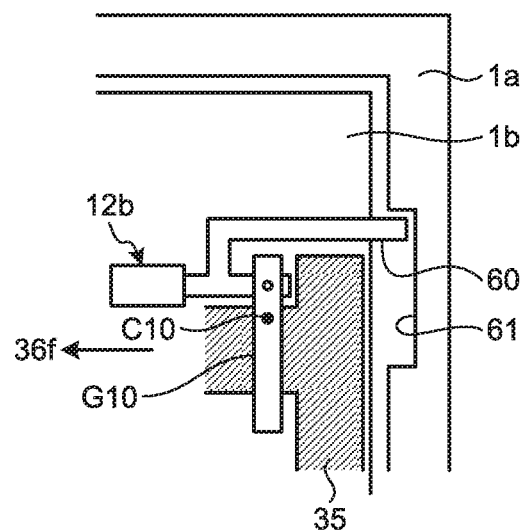
FIGS. 6A and 6B are schematic diagrams illustrating a lock mechanism that limits a pull-out amount of the coin processing unit.
Figure 6B:
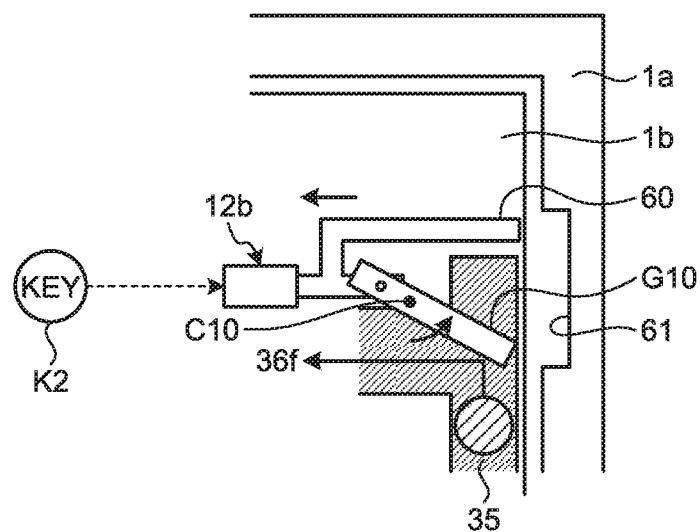

FIGS. 6A and 6B are schematic diagrams illustrating a lock mechanism that limits a pull-out amount d of the coin processing unit 1b. FIG. 7 is a schematic diagram illustrating a state in which the pull-out amount d of the coin processing unit 1b is limited.

As illustrated in FIGS. 6A and 6B, a lock mechanism by an actuator 12b is provided in addition to the lock mechanism by the actuator 12a described above, so as to limit the pull-out amount d of the coin processing unit 1b. That is, a stepwise lock mechanism is realized. The lock mechanism is provided in an existing switching gate G10 that performs sorting of coins from the coin sorting unit 35 to the 500-yen coin storage 36f.

As illustrated in FIG. 6A, the switching gate G10 blocks sorting and storage of coins from the coin sorting unit 35 to the 500-yen coin storage 36f in a stopped state, and an engagement portion 60 attached to a linear-motion shaft of a solenoid is engaged with a concave engagement portion 61 provided in the casing 1a.

On the other hand, as illustrated in FIG. 6B, when a current flows to the solenoid, the linear-motion shaft contracts. The switching gate G10 rotates around a shaft C10 of the switching gate G10 in a counter-clockwise direction in FIG. 6B and performs gate switching to perform sorting from the coin sorting unit 35 to the 500-yen coin storage 36f, and release the engagement of the engagement portion 60 with the concave engagement portion 61. In a stopped state, the solenoid can be contracted in conjunction with the rotation operation of a key K2, to release engagement of the engagement portion 60 with the concave engagement portion 61.

FIG. 7 illustrates a stepwise lock operation by the engagement portion 60. In a state in which the engagement portion 60 is engaged with the concave engagement portion 61, the coin processing unit 1b can be pulled out only by the pull-out amount d due to the concave engagement portion 61. That is, the coin processing unit 1b cannot be pulled out by the engagement portion 60, and even after the engagement portion 60 is unlocked, the coin processing unit 1b can be pulled out only by the pull-out amount d by the engagement portion 60. This is because, for example, if a lid is provided on an upper part of the coin processing unit 1b, by limiting the pull-out amount d, the lid for extracting money is not opened unless engagement of the engagement portion 60 is released. Due to this configuration, a multi-stage lock mechanism can be realized, thereby enabling to increase the security level.

The lock mechanism by the engagement portions 50 and 60 described above is for locking the coin processing unit 1b to the casing 1a. However, the present disclosure is not limited thereto, and opening and closing of a lid of the pulled-out coin processing unit 1b can be locked by using an existing actuator.

Acquisition of Opening/Closing Information in Stopped State Due to Power Cut

Even if a lock mechanism by means of the engagement portions 50 and 60 described above is provided, there is a case where the coin processing unit 1b is pulled out by using a key or the like illegally. According to the present embodiment, even in a stopped state due to power cut, events such as pulling-out and opening of the coin processing unit 1b can be recorded as the opening/closing information.

Figure 8A:
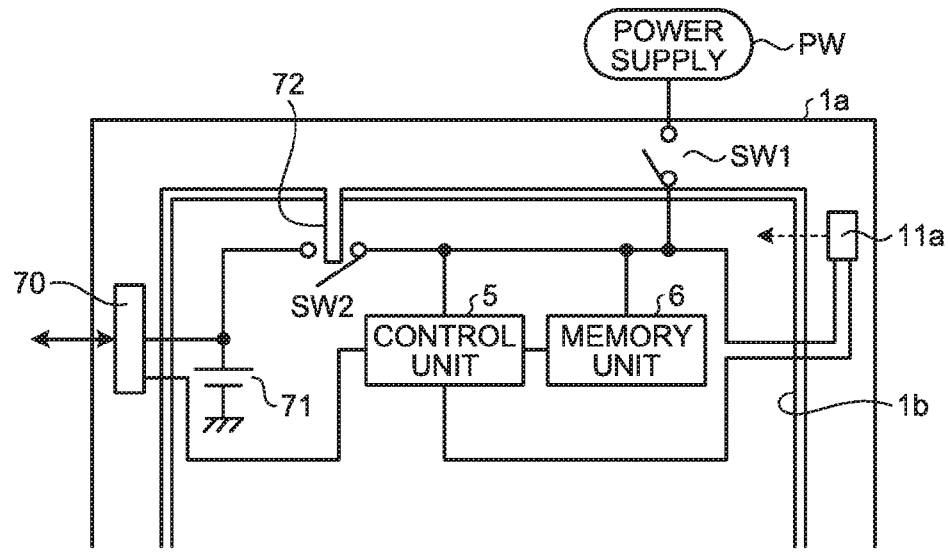
FIGS. 8A and 8B are schematic diagrams respectively illustrating a power connection state when the coin processing unit is in a closed state and in a pulled-out state with respect to the casing.

FIG. 8A is a schematic diagram illustrating a power connection state when the coin processing unit 1b is in a closed state in the casing 1a. As illustrated in FIG. 8A, the coin processing unit 1b includes the controller 5, the memory 6, an internal power supply 71, and a switch SW2. The casing 1a includes a switch SW1 of an external power supply PW, an opening/closing sensor 11a, an engagement projection 72, and an external communication interface 70. The switch SW1 can be provided outside of the money processing apparatus 10.

When the switch SW1 is on, power is supplied from the external power supply PW to the controller 5 and the memory 6 via a power line. When the coin processing unit 1b is in a closed state, the switch SW2 is in an off state by the engagement projection 72. Therefore, when the coin processing unit 1b is in the closed state and the switch SW1 is off, power is not supplied to the controller 5 and the memory 6.

Figure 8B:
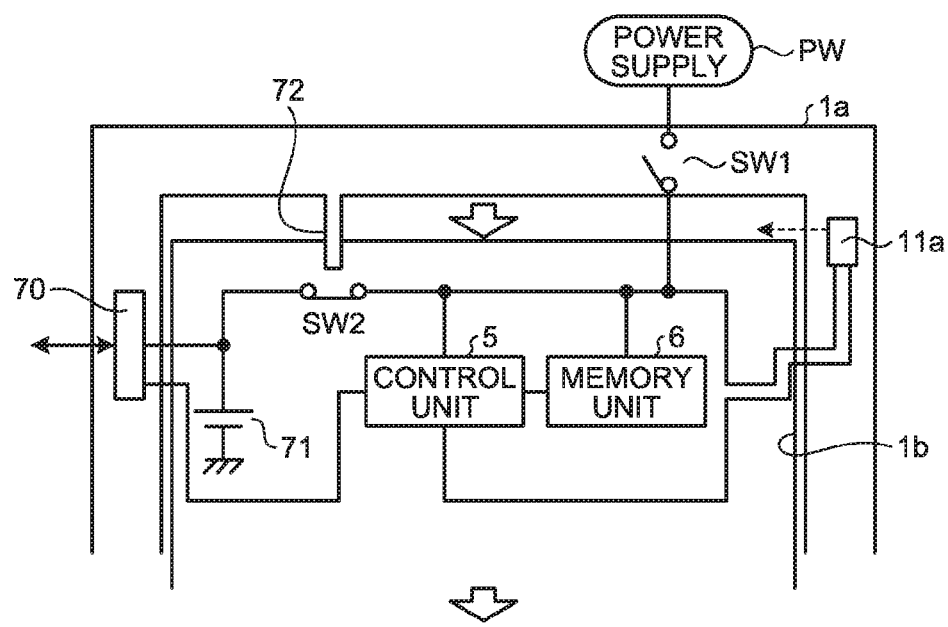

As illustrated in FIG. 8B, when the switch SW1 is in an off state and the coin processing unit 1b is pulled out, the engagement projection 72 is separated from the switch SW2, and the switch SW2 becomes an on state. When the switch SW2 is on, power is supplied to the controller 5 and the memory 6 via the power line to drive the controller 5 and the memory 6. Power is also supplied to the opening/closing sensor 11a to drive the opening/closing sensor 11a. The opening/closing management unit 5b of the controller 5 memorizes a detection result by the opening/closing sensor 11a in the memory 6 as the opening/closing information 6b. Accordingly, the opening/closing information 6b indicating an event that the coin processing unit 1b has been pulled out can be memorized in a state in which power is not supplied from the external power supply PW.

Accordingly, when the switch SW1 is off and is in a stopped state, only when there is a motion such as pull-out of the coin processing unit 1b or opening of the lid, the switch SW2 becomes on to supply power to the controller 5, the memory 6, and the opening/closing sensor 11a. Therefore, the opening/closing information can be recorded and energy saving can be realized.

The internal power supply 71 is a battery such as a lithium ion battery; however, the internal power supply 71 can be a power supply supplied via an external communication connection cable of the external communication interface 70. For example, as the external communication interface 70, a USB capable of performing power supply or a PoE (Power over Ethernet) of a LAN can be used.

The switch SW2 is a mechanical switch having no power supply that uses the engagement projection 72. However, the switch SW2 only needs to be a no-power switch and, for example, can be a reed switch that is turned on when the coin processing unit 1b is pulled out.

To suppress consumption of the internal power supply 71 when the switch SW2 is turned on, it is desired that the respective sensors in the sensor group 11 and the actuator group 12 execute control to activate only a unit involved with detection of opening and closing of the coin processing unit. It is also desired that the operating sensor performs an intermittent operation. Alternatively, it is desired to extend an intermittent operation cycle.

Application to Bill Processing Unit

In the embodiment described above, pulling-out or opening of the coin processing unit 1b has been described. However, the embodiment can be also applied to the casing 2a and the bill processing unit 2b.

Figure 9:
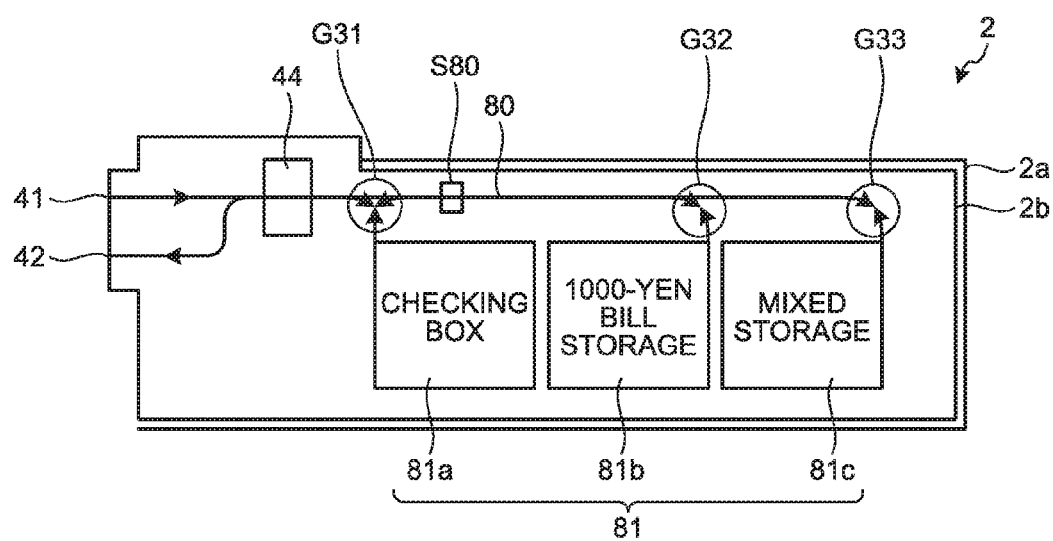
FIG. 9 is a side view conceptually illustrating an internal configuration of a bill processing apparatus illustrated in FIG. 1.

FIG. 9 is a side view conceptually illustrating an internal configuration of the bill processing apparatus 2 illustrated in FIG. 1. As illustrated in FIG. 9, the bill processing unit 2*b* of the bill processing apparatus 2 is covered with the casing 2*a*, and the bill processing unit 2*b* can be pulled out from the casing 2*a* and is provided with a lid for extracting bills on an upper surface or the like, as in the coin processing unit 1*b*.

The bills transferred from a bill slot 41 is distinguished by a bill distinguishing sensor 44, and then stored in a 1000-yen bill storage 81*b* or in a mixed bill storage (mixed storage) 81*c* in a bill storage 81 according to the denominations. The mixed storage 81*c* stores bills other than the 1000-yen bills. For example, 10000-yen bills and 5000-yen bills are mixed and stored in the mixed storage 81*c*. A checking box 81*a* is provided in the bill storage 81. The checking box 81*a* is a temporary storage to be used so that the bills stored in the respective bill storages 81*b* and 81*c* are emptied once and the number of stored bills in the respective bill storages 81*b* and 81*c* are recalculated. That is, the checking box 81*a* is used at the time of performing a checking operation. The bill output port 42 is an opening for discharging bills taken out from the bill storages 81*b* and 81*c* to the outside, and is provided in a lower part on the front surface of the bill processing unit 2*b*.

A bill transfer path 80 is arranged between the 1000-yen bill storage 81*b* and the checking box 81*a* and between the mixed storage 81*c* and the checking box 81*a*. Further, a switching gate G31 is arranged at a gateway to the checking box 81*a*, a switching gate G32 is arranged at a gateway to the 1000-yen bill storage 81*b*, and a switching gate G33 is arranged at a gateway to the mixed storage 81*c* on the bill transfer path 80. A sensor S80 is also arranged on the bill transfer path 80, as an image sensor that detects the denomination and passage of transferred bills.

For example, the existing switching gate G31 (an actuator 22*a*) can be provided with a lock mechanism having an engagement portion as in the switching gate G2. Further, the existing switching gate G33 (an actuator 22*b*) can be provided with a lock mechanism as in the switching gate G10. Further, such a configuration can be applied in which the switch SW2 illustrated in FIGS. 8A and 8B and the opening/closing sensor 21*a* illustrated in FIG. 2 are provided to save energy in memorizing opening/closing information in a stopped state.

According to the present disclosure, the engagement portion that engages with the casing in a stopped state due to a power cut to lock the money unit to the casing is provided in an existing actuator provided in the money unit. Therefore, unauthorized usage of the apparatus can be prevented, while maintaining downsizing of the apparatus and suppressing the manufacturing cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A money processing apparatus that performs input/output processing of money in a money unit configured to be pulled out from a casing and opened, the money processing apparatus comprising:
    an actuator provided in the money unit; and
    an engagement portion provided in the actuator, configured to engage with the casing to lock the money unit to the casing during a stopped state due to a power cut,
    wherein the actuator is a switching gate provided on a transfer path of the money unit.

2. The money processing apparatus according to claim 1, wherein the engagement portion is provided in a plurality of the actuators, and each engagement portion locks stepwise an operation to pull out and open the money unit.

3. The money processing apparatus according to claim 1, wherein the actuator releases a lock in conjunction with an opening operation by a key.

4. The money processing apparatus according to claim 1, comprising:
    an opening/closing sensor that detects whether the money unit is in a pulled out state from the casing or an opened state;
    an external power switch that turns on or off power supply from an external power supply;
    an internal power supply provided in the money unit;
    an internal power switch that turns on or off power supply of the internal power supply in a non-power state;
    a controller provided in the money unit and connectable to the external power supply and the internal power supply; and
    a memory provided in the money unit and connectable to the external power supply and the internal power supply, wherein
    the controller receives power supply from the internal power supply, when the money unit is pulled out from the casing or opened, to cause the memory to store a detection result of the opening/closing sensor.

5. The money processing apparatus according to claim 4, wherein the internal power supply is a power supply supplied via an external communication connection cable.

6. The money processing apparatus according to claim 4, wherein the internal power switch is a mechanical switch that is turned on when the money unit is in a pulled out state from the casing or an opened state, and is turned off when the money unit is in a closed state in the casing.

7. The money processing apparatus according to claim 4, wherein the internal power switch is a reed switch that is turned on when the money unit is in a pulled out state from the casing or an opened state, and is turned off when the money unit is in a closed state in the casing.

* * * * *